United States Patent [19]
Torrans

[11] 3,950,121
[45] Apr. 13, 1976

[54] DRIVING MECHANISM FOR VACUUM FORMING DRUM

[75] Inventor: David James Torrans, Kennett Square, Pa.

[73] Assignee: Hercules Incorporated, Wilmington, Del.

[22] Filed: Mar. 18, 1975

[21] Appl. No.: 559,607

[52] U.S. Cl......... 425/326 R; 425/388; 425/DIG. 40
[51] Int. Cl.² ........................................... B29D 7/20
[58] Field of Search......... 425/325, 326 R, 385, 388, 425/387 R, 471, DIG. 40; 264/90, 92, 176 R; 74/219

[56] References Cited
UNITED STATES PATENTS
3,323,274  6/1967  Justus ................................... 264/90
3,421,964  1/1969  Arbit................................ 425/325 X
3,518,725  7/1970  Donofrio............................ 425/388

Primary Examiner—R. Spencer Annear
Assistant Examiner—Mark Rosenbaum
Attorney, Agent, or Firm—James W. Peterson

[57] ABSTRACT

The invention is a drive mechanism for a rotary vacuum forming multifaced drum to essentially match the surface speed of said drum to the constant speed of a web of film issuing from a film die. The instant invention provides apparatus to continuously vary the rotational speed of a multifaced vacuum forming drum with any number of faces, such that if a web of hot film were extruded at a constant rate, the rotational speed of the drum would vary as required to accept the film at a constant rate to provide an essentially uniform thickness of material on the surface of the drum for thermoforming.

3 Claims, 3 Drawing Figures

DRIVING MECHANISM FOR VACUUM FORMING DRUM

BACKGROUND OF THE INVENTION

Conventional thermoforming is accomplished by utilization of a flat die surface having the number and type of cavities required in it and by placing a sheet of semi-molten film directly over top of the die and applying either pressure or vacuum or both to form the film to the shape of the cavity. It is even more desirable to provide a continuous process in which a web of film may be continuously extruded and utilized by mold cavities. It is highly desirable to extrude the film web at a constant speed in order to closely control crystallization, thickness, degree of crystallinity, etc. The problem then becomes the matching of the constant film speed to that of the surface speed of the die cavities. It is generally not possible to manufacture die cavities in the surface of a truly cylindrical surface, and it is, therefore, necessary to construct a drum with several flat faces on it, each of which contains a number of cavities on which to vacuum or pressure form articles. If such a multifaced drum is driven at a constant rotational speed, the web of film which issues from the film die at a constant translational speed will vary in thickness on contact with the drum as the radius, and, hence, the tangential velocity of the drum varies where it is contacted by the film. To solve this problem, it would be necessary to provide an expensive and complicated variable speed drive transmission to drive the drum so that the surface velocities would be constant at the point of film tangency. The instant invention provides a simple and unique means to continuously vary the rotational speed of a multifaced vacuum forming drum with any number of faces such that if a web of hot film were extruded at a constant rate, the rotational speed of the drum would vary as required to accept this film at approximately said constant rate.

Objects of the Invention

It is a primary object of the instant invention to provide means for driving a multifaced vacuum forming drum at variable speeds to accept film extruded at a constant rate on the surface of said drum essentially without deforming said film.

It is yet another object of the instant invention to provide apparatus that is simple and inexpensive.

It is still another object of the instant invention to provide a design that will minimize deviations between film production speed and drum surface speed.

It is further an object of the instant invention to provide a driving mechanism which will allow a change in the number of faces on the vacuum forming drum when it is desired to manufacture a different article without necessitating any corresponding major change in the drum driving mechanism.

Summary of the Invention

It is highly desirable to provide apparatus for high speed thermoforming that will drive a multifaced vacuum forming drum, or the like, at variable speeds to match drum surface speed and constant film extrusion speed. To accomplish this purpose, the instant invention provides a vacuum forming drum that is rotated by a belt around its periphery. The belt is moved by a pulley at a constant speed that is equal to or proportional to extruded film speed, said belt makes contact with said forming drum at the portions of said drum that are identical to or symmetrical to the cross-sectional geometric configuration of said forming drum.

DESCRIPTION OF THE PREFERRED EMBODIMENT

Figure 1:
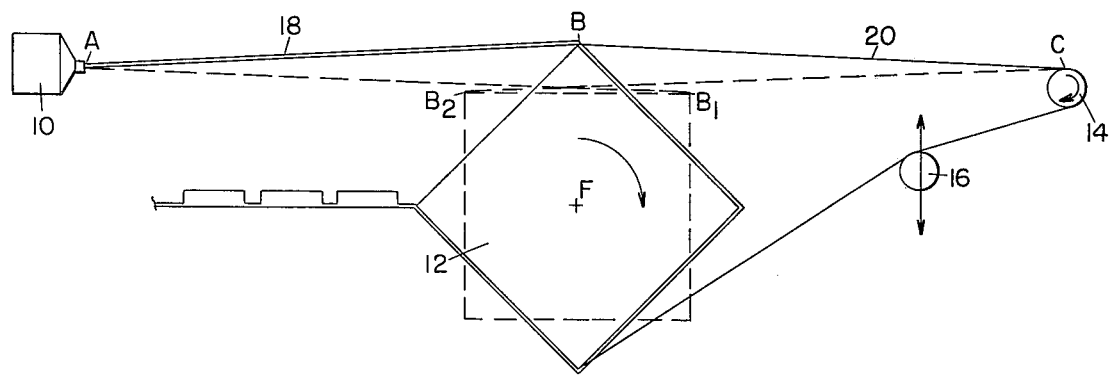
FIG. 1 is a side view of the drive mechanism of the instant invention.

With continued reference to the drawing, FIG. 1 shows a film die 10, forming drum 12 and drive pulley 14 for vacuum thermoforming film 18. The vacuum forming drum 12 shown is a four-sided forming drum, each side containing one or more molding cavities into which hot film 18 extruded from film die 10 is sucked by the programmed application of vacuum. In FIG. 1, the vacuum forming drum 12 is rotated clockwise as is drive pulley 14. Drive pulley 14 drives belt 20, which passes around the periphery of the forming drum 12. Idler 16 is spring loaded about a movable axis to maintain the driving belt 20 in tension. It is understood that it is within the scope of the invention to drive multiple sided forming drums having any number of sides. It is understood that a drum rectangular in cross section with only two long sides with cavities and two very short sides only long enough to make space for the necessary vacuum ducts and cavities, etc., might be construed to be a "two" sided drum. The desirability of such a drum could be great where two flat molds are already in existence for operation with reheated sheets via the classic vacuum forming procedure. It is also within the scope of the invention to drive either a vacuum drum or a drum having mold cavities contained therein for molding film which is pressurized by a positive external pressure into the mold cavities or any combination of vacuum and pressure for forming. It is further within the scope of the invention to drive the forming drum by drive belt, chain, or equivalent means. Instead of driving the periphery of the forming drum, it would be possible to drive a smaller pulley that is coaxially mounted and symmetrical in cross section to that of the forming drum at a proportionate speed to make the drum surface speed and the film web speed equal, e.g., the belt could be run at half the web speed on a pulley that was symmetrical to and one-half the cross sectional size of the forming drum. The corners of the forming drum will have to be somewhat rounded off to prevent cutting of the film, and the belt groove or chain sprocket at the corners of the drum should conform to such curvature.

Figure 2:
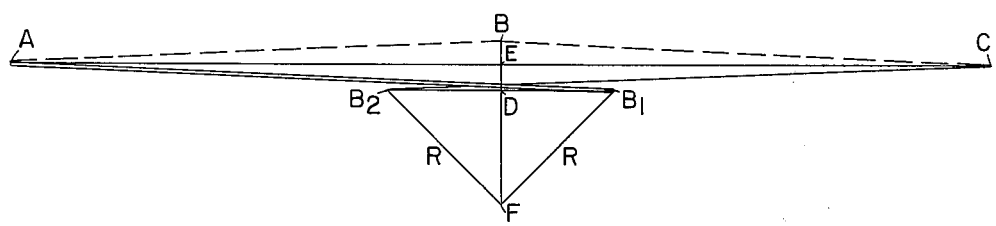
FIG. 2 is a schematic showing the geometrical relationships of FIG. 1 except that the drum has been rotated 45° from the position shown in FIG. 1.
Figure 3:
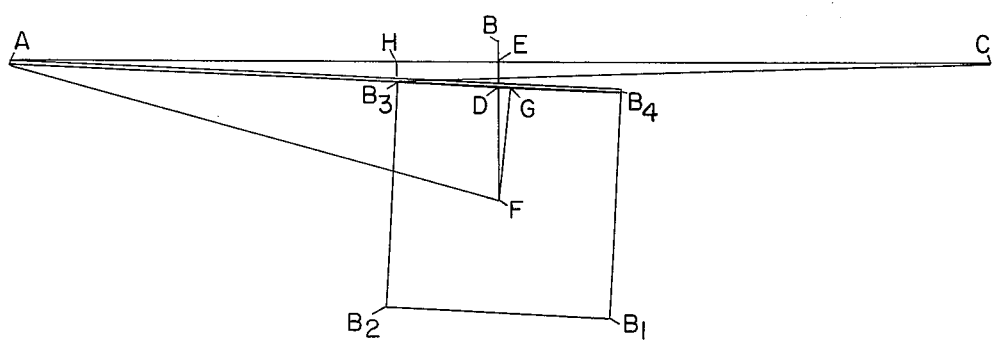
FIG. 3 is a schematic view as in FIG. 2 except that the drum has been rotated 90° from the position shown in FIG. 2.

FIG. 1 illustrates the way in which points A, B and C should be located as a first approximation to minimize the effects of variation in the radius of the forming drum. In this instance, AB and BC represent the film and belt when a forming drum 12 has a maximum radius and $AB_1$ and $B_2C$ represent the film and belt at the position of minimum radius of the drum (shown in phantom line). Note that $AB = BC$ and that $B_2C = B_1A$; hence, the film speed at either B or $B_1$ is equal to the belt speed. This will be true only at eight times in a whole revolution of the drum (where it is a four-sided drum). In FIG. 2, points A, B and C are the same as in FIG. 1. F is the center of the drum 12. For the purposes of showing that the drum face speed and film takeup speed are very close to equal, it is desirable to calculate the increase in film length from $AB_1$ as shown in FIG. 1 to $AB_3$ as shown in FIG. 3 and then to AB as shown in FIG. 1 and to compare this with the decreases in belt length from $B_2C$ FIG. 1 to $B_3C$ FIG. 3 to BC FIG. 1. If these changes are nearly identical, we can presume that since the shortening of the belt is proceeding at a uniform rate, so is the lengthening of the film.

For the purposes of these calculations, it will be assumed that point C is fixed although in fact the point of tangency of the driving belt to the pulley will vary as the $<B_2CE$ varies in FIG. 2 with rotation of the drum. This effect can be minimized to any desired extent by increasing the distance EC. For the purposes of calculation, let us assume that in FIG. 2 $FD = B_2D = B_1D = 1$, $R = \sqrt{2} = BF$, $BE = ED$ and $EC = AE = 2$. Then $$BD = R - DF = 1.414213 - 1. = 0.414213$$

$$BE = ED = 0.414213/2 = 0.207107$$

$$AB_1 = \sqrt{(AE + DB_1)^2 + ED^2}$$

$$= \sqrt{9 + 0.042893} = 3.007140$$

which also equals $B_2C$

In FIG. 3 and FIG. 2:

$$\tan < EAF = \frac{FD + DE}{AE} = \frac{1 + 0.207107}{2} = 0.603554$$

$$<EAF = 31.1132°$$

$$\sin < EAF = \frac{EF}{AF} = 0.516731 = \frac{1.207107}{AF}$$

$$AF = 2.336045$$

$$\sin < GAF = \frac{GF}{AF} = \frac{1}{2.336045} = 0.428074$$

$$<GAF = 25.3454°$$

$$<HAB_3 = <EAF - <GAF$$

$$= 31.1132° - 25.3454° = 5.7678°$$

$$AG = AF \cos. <GAF$$

$$= 2.336045 \times 0.903744 = 2.111186$$

$$AB_3 = AG - B_3G = 2.111186 - 1 = 1.111186$$

$$AB_4 = AB_3 + B_3B_4 = 3.111186$$

$$\sin < HAB_3 = \frac{HB_3}{AB_3} = 0.100497 = \frac{HB_3}{1.111186}$$

$$HB_3 = 0.111671$$

$$< \cos HAB_3 = \frac{AH}{AB_3} = 0.994937 = \frac{AH}{1.111186}$$

$$AH = 1.105560$$

$$HC = 4 - AH = 2.894439$$

$$B_3C = \sqrt{HC^2 + B_3H^2} = \sqrt{8.377780 + 0.012470}$$

$$= 2.896592$$

$$AB = BC = \sqrt{AE^2 + EB^2}$$

$$= \sqrt{4 + 0.042893}$$

$$= 2.010695$$

To recapitulate:

|  |  | Film Length |  | Belt Length |
|---|---|---|---|---|
| Figure 1 | AB | = 2.010695 | CB | = 2.010695 |
| Figure 3 | $AB_3$ | = 1.111186 | $CB_3$ | = 2.896592 |
| Figure 3 | $AB_4$ | = 3.111186 |  |  |
| Figure 2 | $AB_1$ | = 3.007140 | $CB_2$ | = 3.007104 |

Rotation from Figure 2 to Figure 3:

| | |
|---|---|
| Film length increase is $AB_4 - AB_1$ | = 3.111186 − 3.007140 = 0.104046 |
| Belt length decrease is $CB_2 - CB_3$ | = 3.007104 − 2.896592 = 0.110512 |

Rotation from Figure 3 to Figure 1:

| | |
|---|---|
| Film length increase is $AB - AB_3$ | = 2.010694 − 1.111186 = 0.899508 |
| Belt length decrease is $CB_3 - CB$ | = 2.896592 − 2.010694 = 0.885898 |

Hence, it is seen that in a quarter turn of the blow molding drum, from the position of FIG. 2 to FIG. 3, there will be a slight thickening of the film when the suspended web is longest and hence well distributed, followed by a much smaller over-stretching when it is shorter, and the drum rotates from the position of FIG. 3 to that of FIG. 1. In summary, the rate of film length increase is approximately equal to the rate of belt length decrease.

If we make $EC = 3$ while $AE$ remains 2, we find that:
FIG. 1 — $CB = 3.007140$
FIG. 3 — $CB_3 = 3.896041$
FIG. 2 — $CB_2 = 4.005358$
and hence, the belt length decrease from FIG. 2 to FIG. 3 is 0.109317. This is nearer to the absolute film length increase for this amount of rotation. Similarly, the belt length decrease from FIG. 3 to FIG. 1 is 0.888901. This is also nearer to the absolute film length increase for this amount of rotation. Similarly, any increase of either AE or EC will reduce the small existing differences which occur during the rotation cycle between film take-up and belt take-up. They become exactly zero when both AE and EC equal infinity. Hence, it can be seen that a simple, inexpensive drive means has been provided which essentially matches the surface speed of a forming drum to the constant speed of a web of film issuing from a film die.

It is understood that the invention is not limited to the precise construction shown, but changes are contemplated as readily fall within the spirit of the invention as shall be determined by the scope of the appended claims.

What I claim and desire to protect by Letters Patent is:

1. A driving mechanism for a forming drum comprising:
   a rotational forming drum;
   a film dye for extruding film onto the surface of said forming drum, said film being extruded from said die at a first point, and contacting the surface of the forming drum at a second point;
   a drive pulley and belt means driven by said drive pulley, said belt means contacting the periphery of said forming drum and said drive pulley, said drive pulley contacting the belt means returning from the surface of said forming drum at a third point, said first, second and third points being substantially in line and the distance from said first point to said second point being approximately the same distance from said second point to said third point.

2. A device as in claim 1 wherein said forming drum further includes vacuum means connected thereto, said vacuum means activated when the vacuum forming drum contacts extruded film at said second point and being deactivated after further rotation of said vacuum forming drum to release the extruded film after thermoforming.

3. A device as in claim 2 wherein said drive pulley and belt means comprise a sprocket and chain, respectively, and the periphery of said vacuum forming drum further includes chain sprockets.

* * * * *